UNITED STATES PATENT OFFICE.

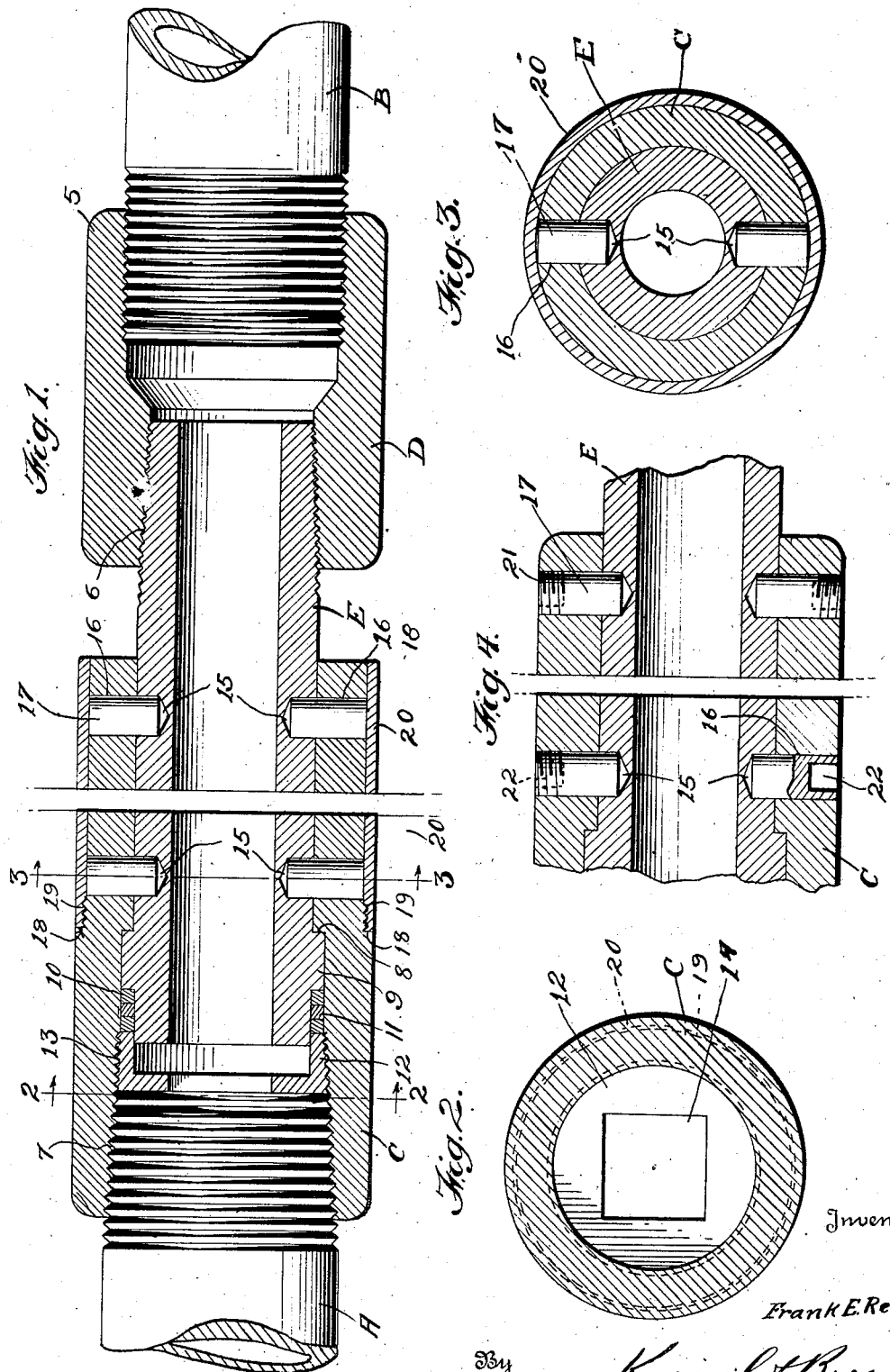

FRANK E. REED, OF HOUSTON, TEXAS.

SHAFT COUPLING.

1,414,207.  Specification of Letters Patent.  Patented Apr. 25, 1922.

Application filed July 6, 1920. Serial No. 394,050.

*To all whom it may concern:*

Be it known that I, FRANK E. REED, a citizen of the United States, and resident of Houston, in the county of Harris and State of Texas, have invented certain new and useful Improvements in Shaft Couplings, of which the following is a specification.

My invention relates to shaft couplings, and more particularly to a coupling member designed so as to be converted into a swivel member when a predetermined degree of strain is exerted upon the shafting in which this coupling member is inserted.

In drilling into the earth to locate deposits of oil, water, coal, iron, etc., it is necessary in many instances to go down several thousand feet to drill, and ofttimes the drill comes in contact with bed rock, which causes the same to break or twist off from the long sections of shafting extending down into the hole. It is an object of my invention to provide a coupling member adapted to be positioned in the shafting, which will be so designed as to stand a predetermined degree of strain, and upon an overload to be converted into a swivel coupling member which will allow the shafting to rotate without further damaging the drill.

One way in which I accomplish this object is shown in the drawings, and comprises two tubular sleeve members capable of screw-threaded engagement with two sections of the shafting. A connecting member is positioned intermediate these two sleeve members, the same being screw-threaded to one of them and being retained within the other sleeve member by means of an annular collar, which abuts an interiorly formed shoulder upon the sleeve member. With the structure thus far described, a swivel connection would be set up between the two sleeve members, and in order to rigidly unite these two parts, I insert shear pins, formed preferably of some light section of metal and adapted to project through the sleeve member into the connecting member, and thereby rigidly unite the same. However, inasmuch as these pins are of a light section of material, it is obvious that when an excess torsional strain is applied to the two adjacent sections of shafting, these pins will be sheared off, thereby permitting rotation of one sleeve with respect to the other.

Various objects will appear hereinafter in the specification and in the drawings, in which—

Fig. 1 is a longitudinal section of my improved coupling member;

Fig. 2 is a section on line 2—2 of Fig. 1;

Fig. 3 is a section on line 3—3 of Fig. 1; and

Fig. 4 is a fragmentary sectional view, showing a modified form of the shear members.

In the drawings, A and B indicate, respectively, two sections of hollow shafting, of the type generally used for deep drilling. The coupling member comprises sleeves C and D, and a tubular connecting member E.

The sleeve D is provided with interior screw-threads 5, which provide means for engagement with a section of shafting B. The opposite end of the sleeve D is also interiorly screw-threaded, as at 6, to provide for engagement with one end of the tubular connecting member E.

The sleeve C is provided at one end thereof with interior screw-threads 7, to provide suitable connection for the section of shafting A. This sleeve C is also provided with an annular shoulder 8, for a purpose to be more fully hereinafter described.

The tubular connecting member E, as hereinbefore stated, has a screw-threaded connection with the sleeve D, and is provided adjacent its opposite end with an interior circumferential collar 9. This collar 9 is adapted to bear against the annular shoulder 8, formed upon the interior of the sleeve C, and thereby prevent withdrawal of the sleeve in one direction. By so forming the collar 9, a recess 10 is provided between the inner wall of the sleeve C and the outer end of the connecting member E. Into this recess suitable packing rings 11 may be placed and the same secured in position by a gland 12, which engages screw-threads 13 upon the interior of the sleeve C. This gland 12 is provided with a central aperture 14 for the reception of a tool, to enable the same to be conveniently screwed into position.

From the structure thus far described, it is obvious that a swiveled connection is set up between the sleeves C and D, by reason of the shouldered connection between the tubular connecting member E and the sleeve C. In order to form a coupling member capable of transmitting rotary motion from one adjoining section of shafting to the other, it is necessary that the sleeve C and the connecting member E be connected to prevent independent rotary motion. To accomplish this I provide the walls of the connecting member E with recesses 15, disposed at opposite sides thereof, or in any other manner which will retain the maximum strength of the member E. The sleeve C is provided with corresponding openings 16, to enable shear pins 17 to be inserted through the sleeve C and into the connecting member E, as clearly illustrated in the drawings.

The sleeve C is provided with a shoulder 18 and exterior screw-threads 19. An interiorly screw-threaded sleeve 20 is adapted to be slipped over the sleeve C and to abut the shoulder 18 formed upon this sleeve C. In this manner the shear pins 17 are prevented from being accidentally displaced, and thereby prevent independent rotary motion between the sleeve C and the connecting member E.

In Fig. 4 I have shown a modified form of this shear pin connection. In this figure the shear pins 17 are shown as provided with screw-threads 21, to adapt the same to screw-threadedly engage the sleeve C and thereby be retained in operative position. These pins are also provided with openings 22, to adapt a tool to be inserted therein to enable the same to be conveniently screwed into position. In this form the use of the sleeve 20 is dispensed with and the shear pins 17 are independently retained in place.

In assembling my coupling, the sleeve C will be passed over the connecting member E from the righthand end thereof, as seen in Fig. 1, until the shoulder 8 abuts the collar 9 formed exteriorly of the connecting member E. The packing rings 11 will then be put in place and the gland 12 screw-threaded into position. The sleeve D is then positioned upon the other end of the connecting member E and the coupling is ready to be inserted between two sections of shafting. It is obvious that the shear pins 17 may be readily inserted and be retained in place by means of the sleeve 20.

The operation of this coupling may be briefly described as follows: Assume that the same is inserted between two sections of shafting and that the shafting extends down into the earth during the process of drilling. Should the drill become stuck in rock or in some other manner prevented from rotating, the pins 17 would be sheared off by reason of the torsional strain between the sleeve C and the connecting member E. When said pins are sheared off there will be set up between the sleeve C and the connecting member E a swiveled connection by reason of the collar 9 and the shoulder 8 of the members C and E, respectively. It should be understood, of course, that the shear pins 17 will be of sufficient number and strength to resist a percentage of the maximum amount of strain which the drill or shafting is capable of standing, and therefore, when the point of maximum strength of the pins has been passed, the coupling will be converted into a swiveled connection, and the rotary power ordinarily transmitted to the drill through the sections of shafting will cause the section above this coupling to rotate and the drill to remain idle. By reason of this connection the drill may be then withdrawn from the earth and new shear pin members inserted. An objection to the type of devices usually employed in drill shafts is, that when a breakage occurs and the shafting is withdrawn from the earth, the drill, and frequently several lengths of shafting are disconnected and remain in the ground, thereby occasioning considerable expense and loss of time.

It is also usual in drill shafting of this type to connect the same to a slush pump and to force water under pressure therethrough to clean out the particles of dirt and stone which cover the drill. I have provided means for accomplishing this, by so forming my coupling that the same will be watertight, and also providing a clear passage centrally of the coupling for the unobstructed flow of water.

It is obvious that this coupling member may be inserted next to the drill member, and a drill might replace the section of shafting A shown in Fig. 1 of the drawings. It is apparent that this coupling will perform its function, no matter where the same is positioned, inasmuch as the torsional strain will, when transmitted to the coupling and when the point of maximum strain has been reached, convert itself into the swivel connection and thereby obviate all danger of injury to the drill or shafting.

I do not wish to be limited to the specific application of this coupling as shown and described, as it is obvious that various modifications may be made without departing from the spirit and scope of this invention, and I specifically reserve this right.

Having thus described my invention, what I claim is:—

1. A coupling member for rigidly connecting two sections of shaft to prevent independent rotation or axial displacement of said shaft, two parts of said coupling member being provided with cooperating shoulders whereby a swivel connection is formed upon undue torsional strength.

2. A coupling member, comprising two sleeves and a connecting member, and means preventing independent rotation of the sleeves and connection member, said means adapted to be destroyed upon undue strain thereon, to convert the connection between one of said sleeves and said connecting member into a swivel connection.

3. A coupling, comprising sleeves, a connecting member for receiving said sleeves, a rigid connection between one of said sleeves and said connecting member, and pins connecting the other of said sleeves and said connecting member and preventing independent rotation thereof, said pins adapted to be sheared off upon excess torsional strain upon said sleeve.

4. A coupling member adapted to be inserted between two sections of shafting and comprising sleeves, a connecting member, one of said sleeves being permanently connected to said connecting member and the other sleeve having a swiveled connection thereto, and pins extending through said second sleeve and into said connecting member, said pins preventing independent rotation of said second sleeve except when excess torsional strain is applied thereto.

5. A coupling, comprising two sleeves, means carried by said sleeves for inserting said coupling in a length of shafting, a connector for said sleeves, means for permanently attaching one sleeve to said connector, means for allowing independent rotary motion to the second sleeve but preventing endwise displacement thereof, means provided for preventing independent rotation of said second sleeve with respect to said connecting member, comprising pins, said pins being adapted to be sheared off when subjected to an excess strain, and means for retaining said pins in position.

6. A coupling, comprising two sleeves, means carried by said sleeves for inserting said coupling in a length of shafting, a connector for said sleeves, means for permanently attaching one sleeve to said connector, an interiorly formed shoulder upon the second sleeve, a circumferential collar upon said connector, means comprising a screw-threaded gland for retaining said circumferential collar abutting said shoulder and preventing longitudinal displacement of said second sleeve with respect to said connector, shear pins passing through said second sleeve and projecting into the walls of said connector, and means for retaining said pins in position, said pins being of a light section of material and adapted to be sheared off when subjected to excess torsional strain, to thereby allow independent rotation of said second sleeve with respect to the connecting member.

7. A coupling, comprising two sleeves, screw-threads carried by said sleeves for inserting said coupling in a length of tubular shafting, a connector for said sleeves, means for permanently attaching one sleeve to said connector, an interiorly formed shoulder upon the second sleeve, a circumferential collar upon said connector, means comprising a screw-threaded gland for retaining said circumferential collar abutting said shoulder and preventing longitudinal displacement of said second sleeve with respect to said connector, shear pins passing through said second sleeve and projecting into the walls of said connector, and means for retaining said pins in position, comprising a screw-threaded sleeve.

8. A coupling comprising two sleeves, means carried by said sleeves for inserting said coupling in a length of pipe, a tubular connector for said sleeves, means for permanently attaching one sleeve to said connector, an interiorly formed shoulder upon the second sleeve, a circumferential collar upon said connector, means comprising a screw-threaded gland for retaining said circumferential collar abutting said shoulder and preventing longitudinal displacement of said second sleeve with respect to said connector, packing rings interposed between said gland and said circumferential collar, shear pins passing through said second sleeve and projecting into the walls of said connector and means for retaining said pin in position, said pins being of a light section of material and adapted to be sheared off when subjected to excess torsional strain, to thereby allow independent rotation of said second sleeve with respect to said connecting member.

FRANK E. REED.